United States Patent
Coult et al.

(10) Patent No.: US 6,437,868 B1
(45) Date of Patent: Aug. 20, 2002

(54) IN-SITU AUTOMATED CONTACTLESS THICKNESS MEASUREMENT FOR WAFER THINNING

(75) Inventors: David Gerald Coult, Bechtelsville; Duane Donald Wendling, Kutztown; Charles William Lentz, Lower Heidleburg Township; Bryan Phillip Segner, Upper Macungie, all of PA (US); Gustav Edward Derkits, New Providence, NJ (US); Wan-ning Wu, Springfield, VA (US); Franklin Roy Dietz, Mohnton, PA (US)

(73) Assignee: Agere Systems Guardian Corp., Berkeley Heights, NJ (US)

( * ) Notice: Subject to any disclaimer, the term of this patent is extended or adjusted under 35 U.S.C. 154(b) by 0 days.

(21) Appl. No.: 09/429,327

(22) Filed: Oct. 28, 1999

(51) Int. Cl.[7] .............................................. G01B 11/06
(52) U.S. Cl. ..................... 356/630; 356/632; 438/14; 438/16; 438/692; 269/21; 118/712; 279/3
(58) Field of Search ................................ 356/381, 382, 356/369, 630, 631, 632; 438/16, 14, 692, 8; 269/21; 355/73; 294/64.1; 340/611; 279/3; 118/50, 500, 620, 712, 730

(56) References Cited

U.S. PATENT DOCUMENTS

| | | | | |
|---|---|---|---|---|
| 5,191,218 A | * | 3/1993 | Mori et al. ............ 250/453.11 |
| 5,313,044 A | | 5/1994 | Massoud et al. | |
| 5,337,015 A | * | 8/1994 | Lustig et al. ................ 324/671 |
| 5,433,651 A | * | 7/1995 | Lustig et al. .................. 451/6 |
| 5,436,172 A | | 7/1995 | Moslehi | |
| 5,474,381 A | | 12/1995 | Moslehi | |
| 5,499,733 A | * | 3/1996 | Litvak ........................ 216/38 |
| 5,515,167 A | * | 5/1996 | Ledger et al. .............. 356/357 |
| 5,559,428 A | | 9/1996 | Li et al. | |
| 5,658,183 A | * | 8/1997 | Sandhu et al. ................. 451/5 |
| 5,660,672 A | | 8/1997 | Li et al. | |
| 5,731,697 A | | 3/1998 | Li et al. | |
| 5,741,070 A | | 4/1998 | Moslehi | |
| 5,838,447 A | * | 11/1998 | Hiyama et al. ............. 356/381 |
| 5,838,448 A | * | 11/1998 | Aiyer et al. ................ 356/382 |
| 5,936,733 A | * | 8/1999 | Sandhu et al. ............. 356/357 |
| 6,010,538 A | * | 1/2000 | Sun et al. ................... 356/357 |
| 6,075,606 A | * | 6/2000 | Doan ......................... 356/381 |
| 6,108,091 A | * | 8/2000 | Pecen et al. ................ 356/381 |
| 6,111,634 A | * | 8/2000 | Pcen et al. .................. 356/381 |
| 6,142,855 A | * | 11/2000 | Nyui et al. ................. 356/381 |
| 6,208,425 B1 | * | 3/2001 | Sandhu et al. ............. 356/503 |

* cited by examiner

*Primary Examiner*—Hoa Q. Pham
(74) *Attorney, Agent, or Firm*—Dickstein Shapiro Morin & Oshinsky, LLP

(57) ABSTRACT

A system for measuring the thickness of a wafer while it is being thinned this disclosed. The system and method provide integrating an optical reflectometer into a common wafer thinning apparatus. Using reflected optical signals from the top and bottom of the wafer, the thickness of the wafer is determined with time based calculations in real-time while thinning is occurring. Once the desired thickness has been reached, the thinning operation is halted. By performing the measurement in-situ, this system and a method prevent scrapping of wafers which are overthinned and the reloading of wafers which are too thick. Since an optical reflectometer is used, the measurement is contactless, and thus prevents possible damage to wafers during measurement.

30 Claims, 6 Drawing Sheets

IN-SITU AUTOMATED CONTACTLESS THICKNESS MEASUREMENT FOR WAFER THINNING

BACKGROUND OF THE INVENTION

I. Field of the Invention

The present invention relates to an apparatus and method for monitoring the change in thickness of a substrate, and more particularly to monitoring the change in thickness of a substrate on a semiconductor workpiece, during a CMP operation.

II. Description of the Related Art

In the semiconductor industry, critical steps in the production of semiconductor products include the selective polishing and thinning of substrates. Types of substrates include wafers, glass or ceramic plates, etc. made form a variety of substances, and can be conductive or non-conductive.

Substrates are thinned and polished by any of several well-known methods, for example chemical-mechanical polishing (also known as CMP), reactive ion etching (RIE), wet etching, electrochemical etching, vapor etching, and spray etching.

It is extremely important with thinning of substrates to stop the process when the correct thickness has been achieved. With CMP, substrate material is selectively removed from a substrate by rotating the wafer against a polishing pad, or rotating the pad against the wafer, or both, with a controlled amount of pressure in the presence of a chemically reactive slurry. Removing too much or too little of the substrate, commonly referred to as overpolishing or underpolishing respectively, may result in improper die thickness and therefore result in scrapping of the wafer. Since many process steps have already taken place prior to a CMP step, scrapping a wafer during the thinning of a substrate can mean a significant financial loss.

Various methods have been employed to detect when the desired endpoint of the CMP process has been reached in order to stop the polishing operation. In the prior art, methods for CMP endpoint detection involve the following types of measurement: (1) mechanical measurement such as a dial indicator, (2) simple timing, (3) friction or motor current, (4) chemical analysis of the slurry, (5) capacitive, (6) non in-situ optical, (7) acoustical, and (8) conductive. These prior art methods each have inherent disadvantages such as inability for real-time monitoring, the need to remove the wafer from the polishing apparatus (not in-situ), or unreliability.

The mechanical measurement method is cheap and simple, but is relatively inaccurate, especially if the substrate is fixed to a backing plate, and requires removing the sample from the polishing fixture, which may result in damage to the substrate. The simple timing method gives large errors because it is affected by thickness variations of the substrate and polish rate variations caused by composition of the slurry, pressure of the wafer against the pad, type of pad, and relative rotational speeds. Monitoring the motor current change due to the change in friction produced between the wafer and the pad only provides a resultant value for the variations and provides indirect wafer monitoring at best, with average values for the wafer. Chemical analysis of the slurry requires transporting the slurry from the polishing pad to the analysis location, as well as the use of expensive instrumentation such as inductively coupled plasma (ICP) for atomic emission spectroscopy and does not provide true real time response. Capacitive measurements embed sensing elements in the polishing table below the polishing pad and thus do not provide a continuous and reliable measurement of the change during removal. Capacitive measurements are also especially ill suited for metal substrates on top of multiple levels of metal interconnections. A non in-situ optical method has also been used, but requires that the process be interrupted from time to time for measurement of the reflectivity or thickness change. Acoustical methods have also been proposed, however no encouraging data is available so far. Conductive methods monitor current flowing from electrodes embedded in either the polishing pad or the polishing table through the wafer. This type of method requires some kind of direct contact between the electrodes and the wafer surface as well as their exposure to the corrosive slurry and contact with the polishing pad, which can lead to contamination of the pad and possible scratching of the wafer.

Techniques for measuring the thickness of coatings on metal objects are also known. In U.S. Pat. No. 5,559,428, Li et al., an apparatus and method are disclosed which monitor the change in thickness of a semiconductor substrate by discriminatorily inducing a current in the substrate depending upon the conductivity of the substrate. If the substrate is conductive, eddy currents are induced in the substrate by generating an alternating electromagnetic field with a sensor which includes a capacitor and an inductor. However, this technique is dependent on the system accurately determining the material of the substrate. In addition, as this technique involves contacting the wafer, damage to the wafer may result.

What is needed is an in-situ real-time contactless monitoring of the change in thickness of a substrate which can be any material, including a conductive substrate.

SUMMARY OF THE INVENTION

The present invention provides a system for in-situ contactless measuring of the thickness of a workpiece while the workpiece is being thinned. Such a system prevents the need to re-load the workpiece into a thinning apparatus if the workpiece is determined to be too thick, or scrapping the workpiece if it has been overthinned or damaged due to contact by the measuring device.

According to one aspect of the invention, a common wafer inning apparatus is modified to include an optical reflectometer. The optical reflectometer constantly monitors the thickness of a wafer while the wafer is being thinned. Since the optical reflectometer uses light for measurement, it can perform a large range of measurements in a non-contact nature, with relatively high precision. In addition, executing the measurement in-situ rather than posteriori eliminates the repetitiveness of reloading the wafer to be thinned more. It also minimizes the occurrence of wafer scrap caused by out-of-spec thickness or damage to the wafer from the measurement process.

Multiple optical reflectometers may be used to obtain wafer thickness readings at more than one position on the wafer.

BRIEF DESCRIPTION OF DRAWINGS

The foregoing and other advantages and features of the invention will become more apparent from the detailed description of preferred embodiments of the invention given below with reference to the accompanying drawings in which.

DETAILED DESCRIPTION OF PREFERRED EMBODIMENTS

Figure 1:
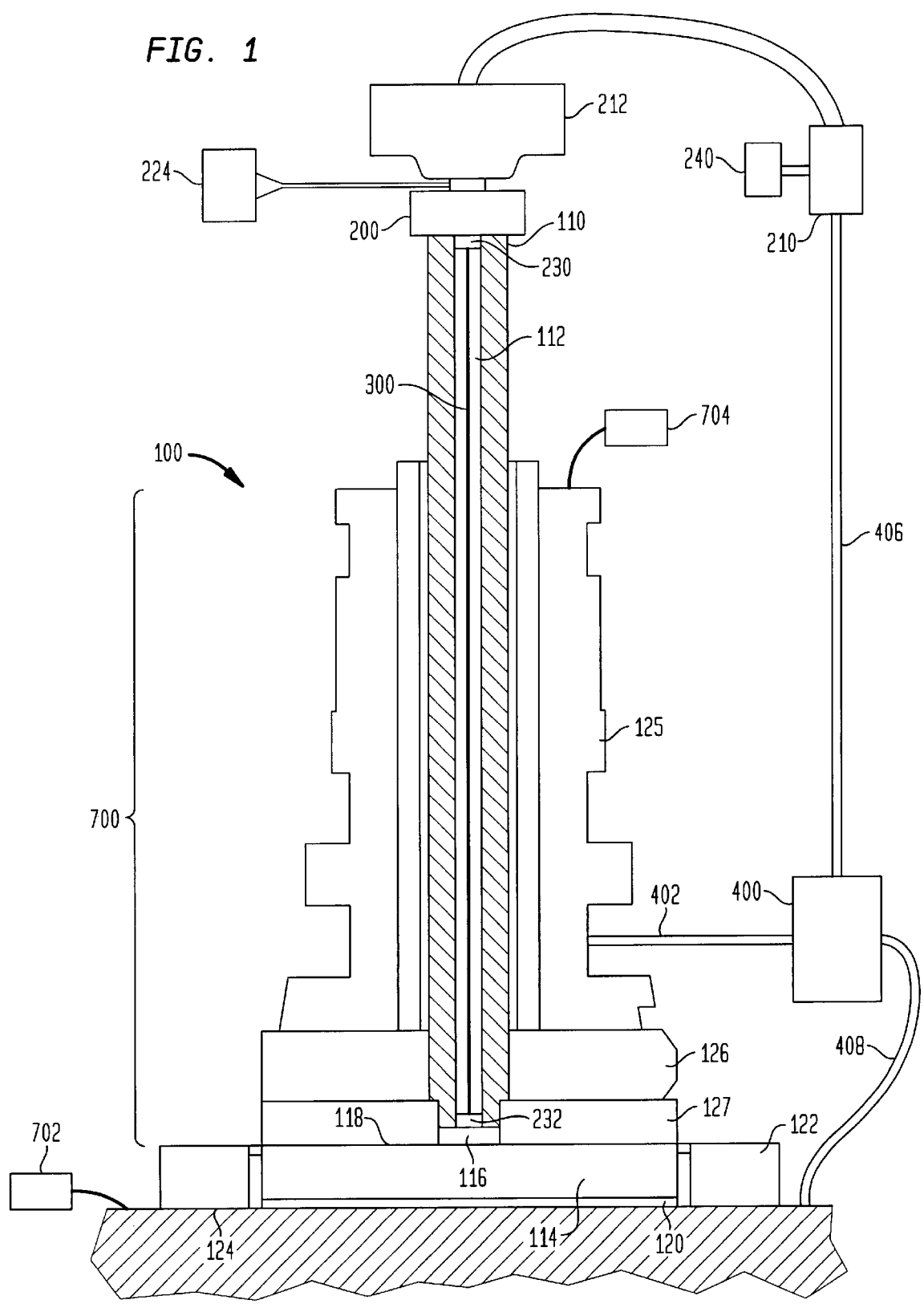
FIG. 1 is a side view of the thinning device constructed in accordance with a preferred embodiment of the present invention.

Referring now to the drawings, where lie reference numerals designate like elements, there is shown in FIG. 1 a system 100 for thinning a semiconductor workpiece. The workpiece may be a semiconductor wafer, glass or ceramic substrate,) etc. The system 100 includes an outer shell fixture 700 with integrally connected components 125, 126, 127, support 122 for the fixture 700, chuckface 114, and vacuum channel 110. The fixture 700 and workpiece 120 are supported by a rotatable table 124. The fixture is rotatable by means of drive 704 ad the rotatable table is movable by means of drive 702. The vacuum channel 110 is a communication path/channel which is connected on its upper end to a source interface 200, which provides an interface for a vacuum source 224 and an optical reflectometer 210 to connect to a hollowed center 112 of the vacuum channel 110. The hollowed center 112 provides a communication path for the suction from the vacuum source 224 and light from the optical reflectometer 210 to reach the chuckface 114. In order to facilitate the needs of the optical reflectometer 210, the hollowed center 112 has an optical beam path running down its center. The optical reflectometer 210 is also connected to a PC 240, which is used in the wafer thickness calculations. The vacuum channel 110 has a light collimator 230 at the top to direct the optical signal down the hollowed center to the chuckface. The chuckface 114 resides at the bottom of the system 100 and sits above the workpiece 120 during operation. A quartz optical window is cemented into a hole in the center of the chuckface to allow the optical signal to pass through, while maintaining vacuum in the hollowed center. Lastly, system 100 contains a grinding control system 400 with control lines 404, 402 to the thinning fixture 700 and control line 406 to the PC 240. The PC 240 uses control line 406 to signal to the grinding control system 400 to stop the thinning process. The grinding control system 400 then in turn signals the thinning fixture 700 via control line 402 and the rotatable table 124 via control line 404 to halt operation. For purposes of the above exemplary description, we have assumed that both the thinning fixture 700 and rotatable table 124 are both rotating counter to each other. However, this invention will work if only one rotates relative to the other.

Figure 2:
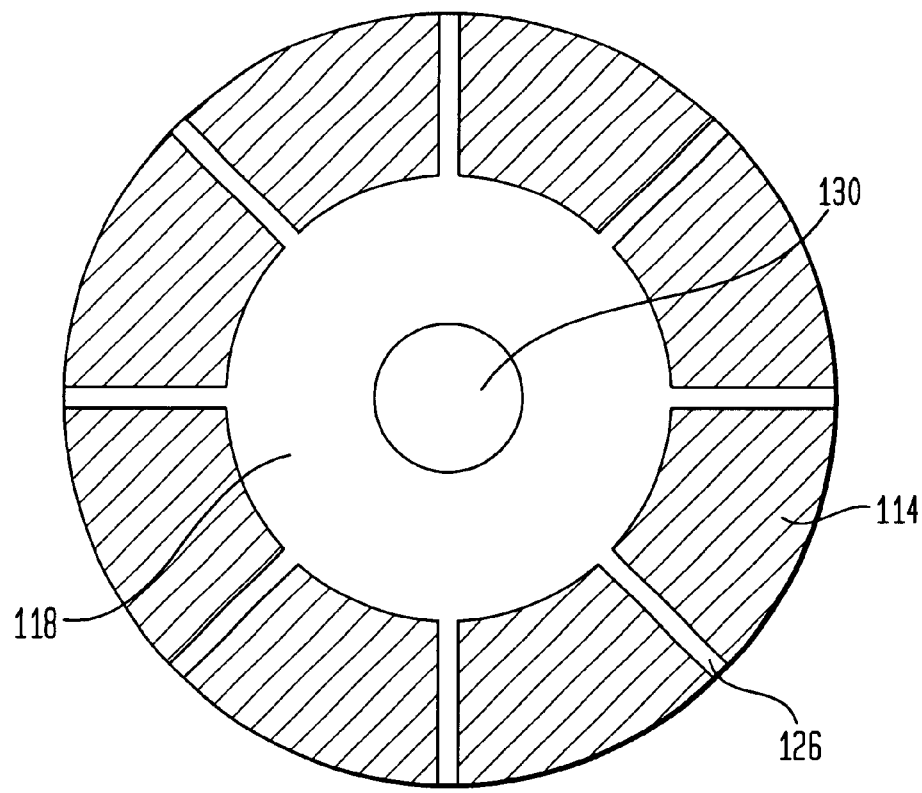
FIG. 2 is a cross sectional top view of the chuckface in accordance with a preferred embodiment of the present invention.

FIG. 2 illustrates a top cross sectional view of the chuckface 114. FIG. 2 shows that the chuckface 114 includes an upper cavity 118, several vacuum conduits 126, and an optical duct 130. The vacuum conduits 126 each have a communication path to the upper cavity 118. These vacuum conduit 126 allow suction from the top of the chuckface to reach the bottom of the chuckface and hold a wafer in place during a CMP operation.

Figure 3:
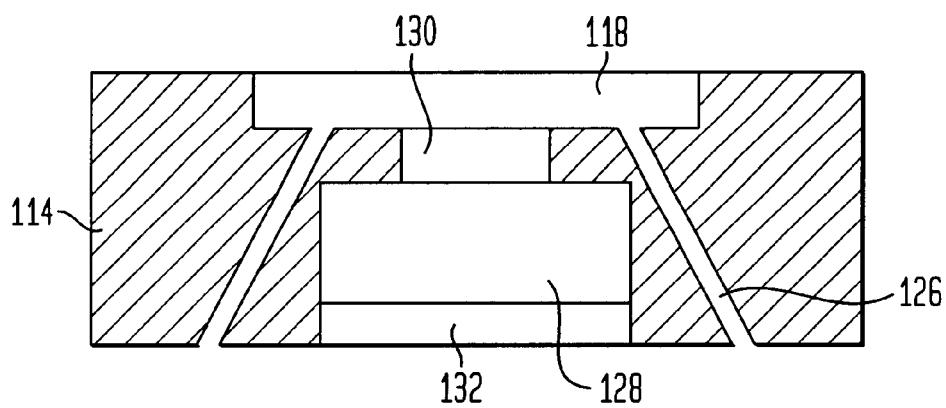
FIG. 3 is a cross sectional side view of the chuckface in accordance with a preferred embodiment of the present invention.

A side cross sectional view of the chuckface 114 is shown in FIG. 3. The optical duct 130 is connected to an optical window 128. The optical window is a quartz disk polished on both surfaces.

Figure 4:
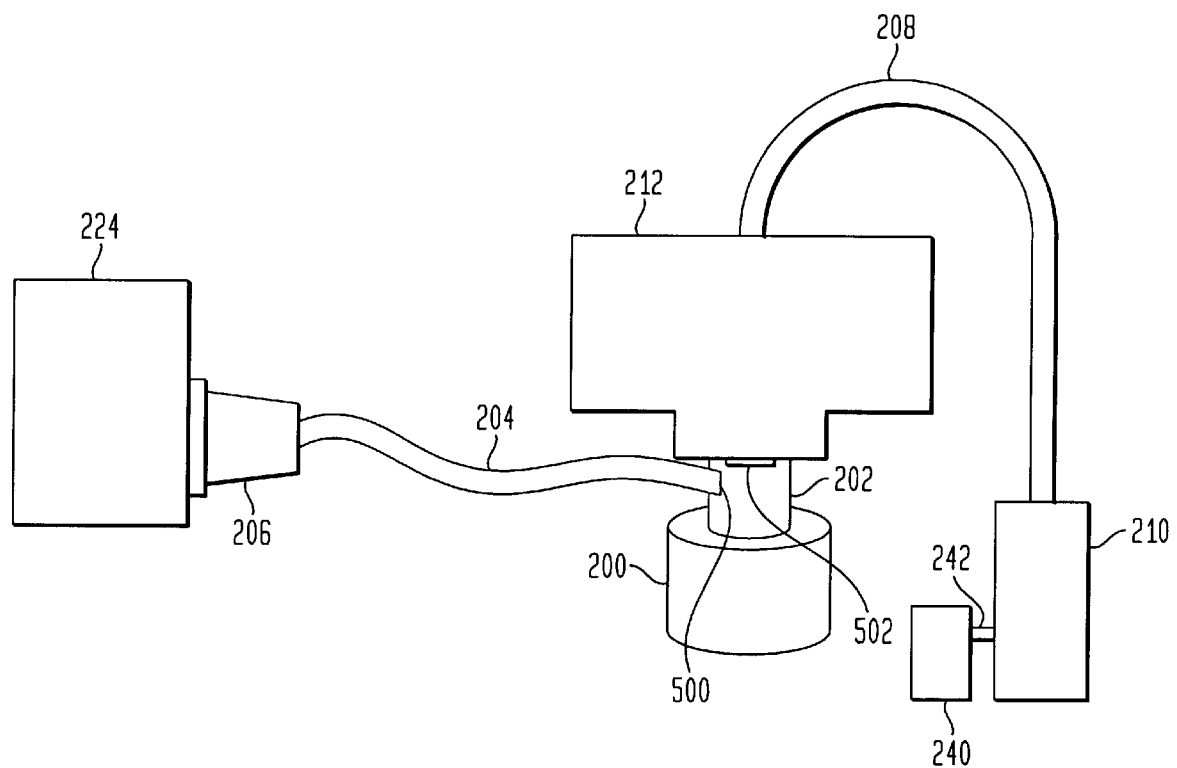
FIG. 4 is a side view of the optical signal source and vacuum source in accordance with a preferred embodiment of the present invention.

FIG. 4 shows the interface of the optical reflectometer 210 and vacuum source 224. The vacuum source 224 is connected to a tube 204 via a connector 206. The tube 204 is connected at its opposite end to a vacuum source inlet 500 on conversion tube 202. The optical reflectometer 210, which contains a light source, e.g. light emitting diode ("LED"), is connected to optical fiber 208, which is terminated at the other end with a collimator and held in place by a x-y-z fiber positioner with pitch and yaw adjustment. The x-y-z translation stage fixture 212 also connects to an optical inlet 502, which is a quartz window that allows the optical signal from the reflectometer 210 to pass into the vacuum channel 110 with no loss of vacuum. Conversion tube 202, which communicates with the optical and vacuum resources 224, 210, passes the vacuum and light to interface 200, which connects to the hollowed center 112 of vacuum channel 110.

Figure 5:
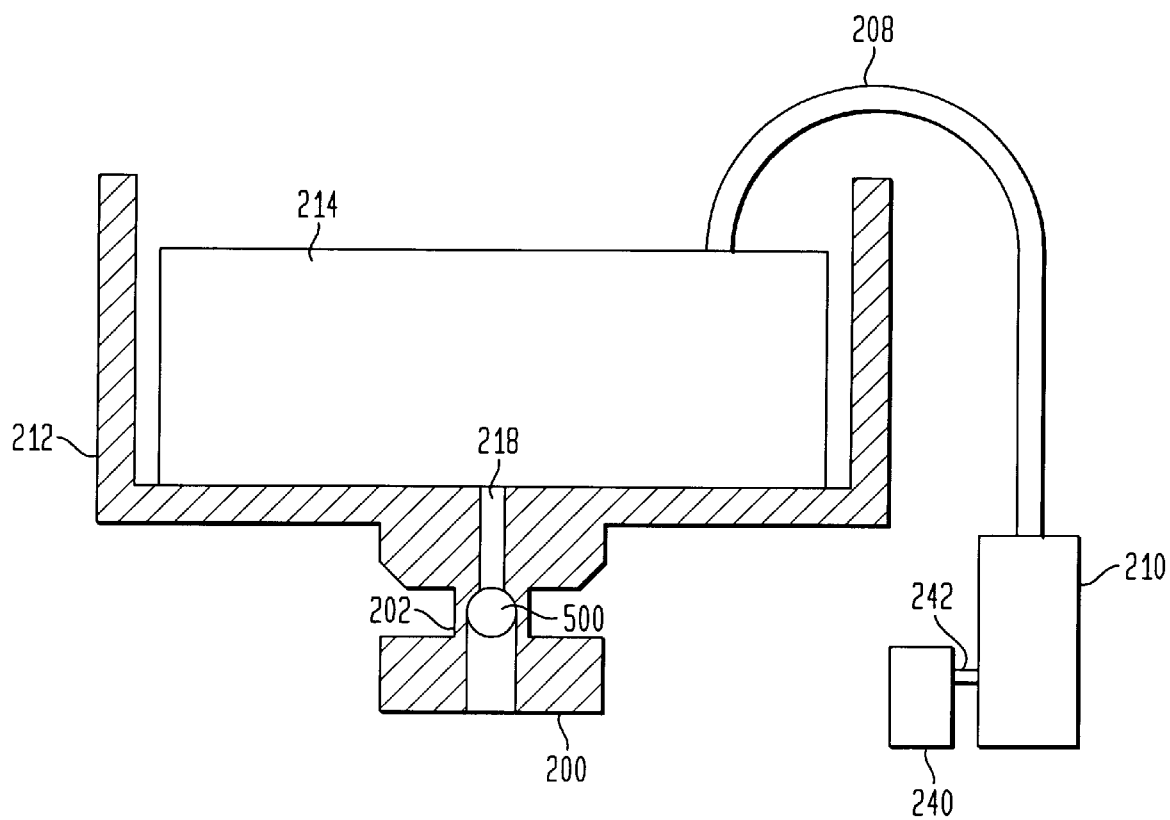
FIG. 5 is a cross sectional view of FIG. 4.

As can be seen from FIG. 5, the x-y-z translation stage fixture 212 contains the x-y-z translation stage components 214 which provides output of an aligned light beam to an optical tube 218. The x-y-z translation stage fixture 212 holds the x-y-z translation stage components 214 in proper orientation. The x-y-z translation stage components 214 receive the optical light from the optical reflectometer 210 via optical fiber 208 and properly align that beam of light to be in alignment with the optical tube 218 such that the optical signal may proceed down optical tube 218 to the vacuum channel 110. The x-y-z translation stage is a mechanically adjusted device, where alignment is performed manually by adjusting the light's alignment so that a maximum reflectance peak is returned back to the reflectometer from the substrate which is being thinned. This indicates that the optical beam is at normal incidence to the substrate. Without such alignment the optical signal would never reach the chuckface 114. The x-y-z translation stage components basically align the ray of light from optical fiber 208 until it is within proper coordinates to go straight down the optical tube 218.

Operations begin with the vacuum source 224 providing suction and the optical reflectometer 210 emanating an optical signal. A wafer 120 to be thinned is placed under the chuckface 114. The suction provided by the vacuum source is routed through connector 206, tube 204, through converter 202, pass interface 200, down the vacuum channel 110 through the hollowed center 112, to the upper cavity of the chuckface 118 to the vacuum conduits 126. This path of vacuum suction secures the wafer 120 to be thinned to the lower side of the chuckface 114, during the thinning operation. At the same time an optical signal emanating from the optical reflectometer 210, is routed through optical fiber 208, and out of the collimator held by the x-y-z translation stage components 214, through the conversion tube 202, pass the interface 200, down the hollowed center 112 of the vacuum channel 110 and through the chuckface 114 via optical window 128.

During a thinning operation, the thing fixture 700 rotates in a direction counter to that of the rotating table 124, while the vacuum channel 110 remains stationary. The friction created between the wafer 120 rotating, by means of the thinning fixture 700 and the rotatable table 124, containing a chemical slurry, thins the wafer 120.

Figure 6:
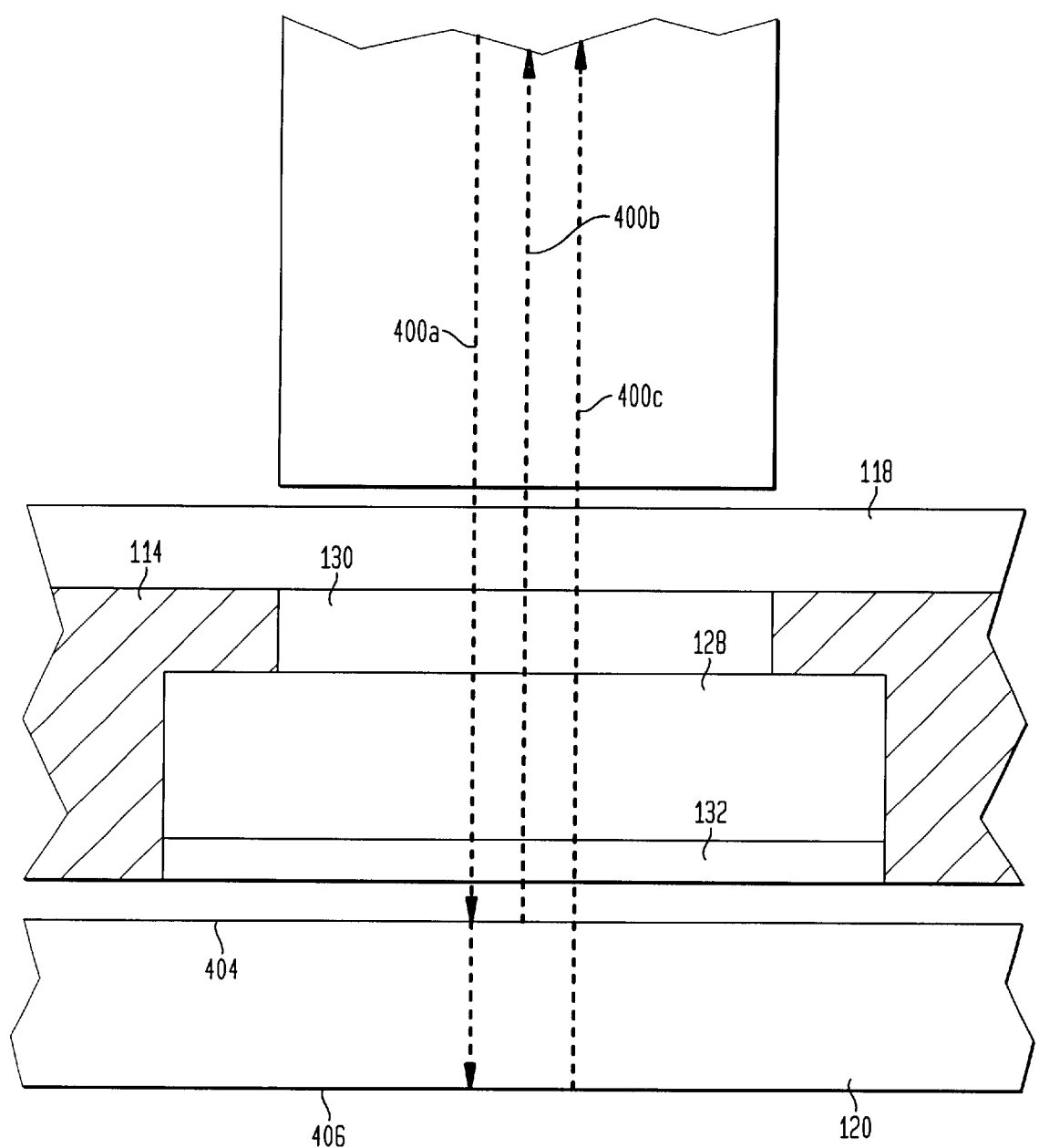
FIG. 6 is an illustration of the path of the optical signals.
Figure 7:
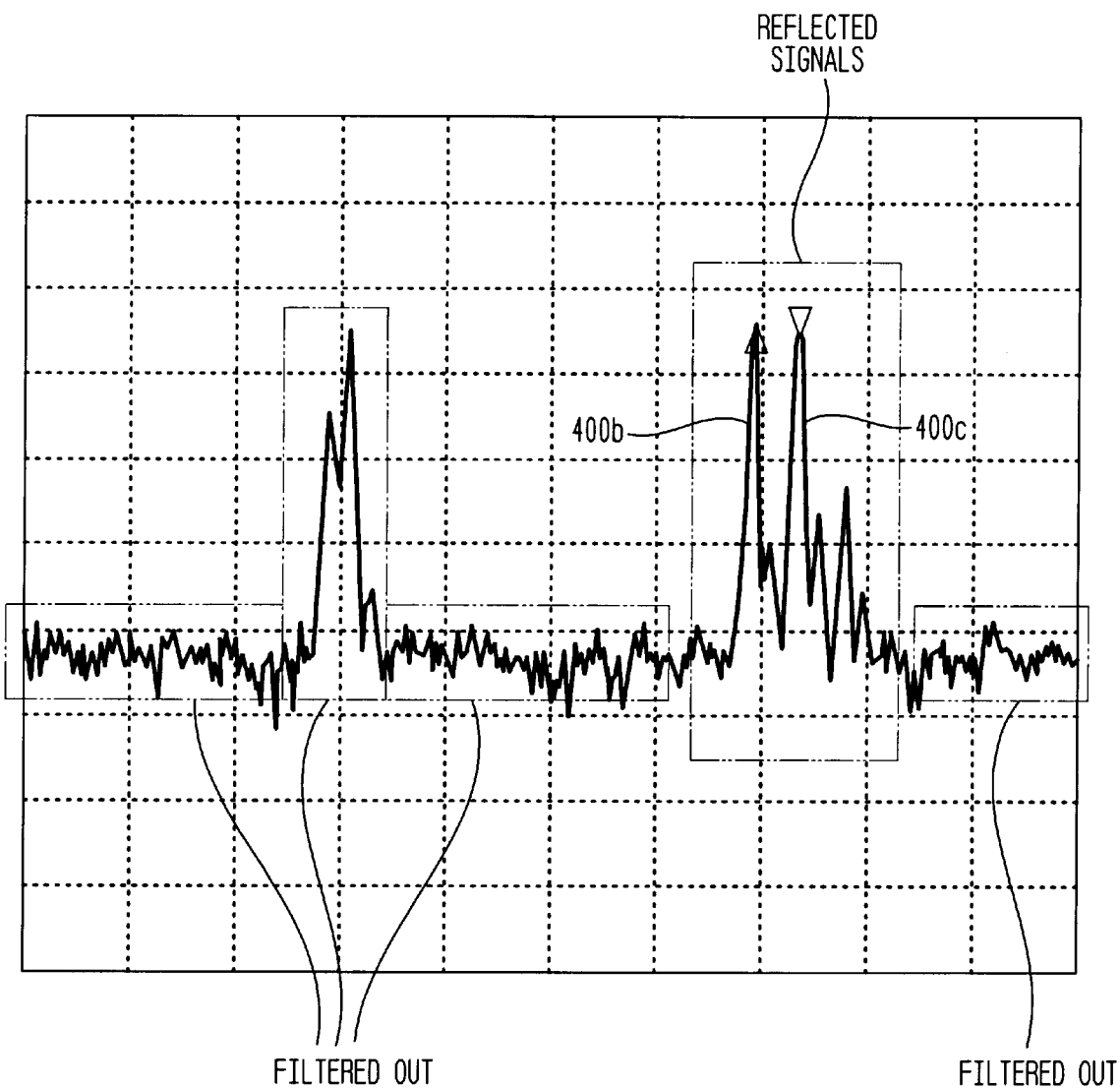
FIG. 7 shows a graph depicting the reflected signals at the top and bottom of the workpiece.

Referring to FIG. 6, during thing the optical signal 400a is routed down the vacuum channel 110 and reflected back up the vacuum channel 110 when it reaches top 404 and bottom 406 surfaces of the wafer 120 respectively. A first reflected optical signal 400b occurs due to a reflection of the source optical signal 400a at the top surface of the wafer 404. A second reflected optical signal 400c occurs due to the reflection of the source optical signal 400a at the lower surface of the wafer 406. Other wafer structures between the top and bottom surfaces of the wafer 406 may result in additional reflected signals. A graphical representation of the two reflected signals 400b and 400c can be seen in FIG. 7. Then, the optical reflectometer determines the optical thickness of the wafer being thinned by comparing reflected signals 400b and 400c to a reference optical signal, by calculating the difference between the time of arrival of the reflected signals 400b and 400c, or by another suitable method. This information is then used by the PC 240 to calculate the physical thickness of the wafer. When the desired thickness is reached, the PC 240 signals to the grinding control unit 400 via control line 406 to stop the thinning function. The grinding control unit then in turn communicates to the thinning fixture 700 and rotating table 124 via control lines 402, 404, respectively, to stop rotating thus stopping the thinning.

In another embodiment, one optical reflectometer may be multiplexed to make measurements on other wafers that are being polished on other polishing fixtures.

This present invention is more efficient than previously used methods because the thickness measurement is performed in-situ while preventing the scrapping or re-loading of workpiece ground to an incorrect thickness.

The scope of the present invention is not to be considered as limited by the specifics of the particular structures which have been described and illustrated, but is only limited by the scope of the appended claims.

What is claimed as new and desired to be protected by Letters Patent of the United States is:

1. A workpiece thinning apparatus comprising:
    a light source;
    a vacuum chuckface for holding a workpiece to be thinned, said chuckface having a center portion with an optical duct to accommodate a signal from said light source, and having a peripheral portion to accommodate at least one vacuum channel, wherein said peripheral portion is not in communication with said light source; and
    a communication path for conducting light from said light source to said chuckface.
2. The apparatus according to claim 1, wherein said communication path further comprises a channel.
3. The apparatus according to claim 2, wherein said channel includes a hollowed internal cavity.
4. The apparatus according to claim 1, wherein said light source is an optical reflectometer.
5. The apparatus according to claim 4, wherein said optical reflectometer includes a light emitting diode.
6. The apparatus according to claim 1, wherein said thinning apparatus further comprises a vacuum source connected to said communication path.
7. The apparatus according to claim 6, wherein said communication path further comprises a collimator at one end of an optical fiber.
8. The apparatus according to claim 1, wherein said chuckface includes an upper cavity with communication channels for conducting air to vacuum conduits, which provide suction to said workpiece.
9. The apparatus according to claim 1, wherein said light source is connected to a translation stage for aligning said light source with said communication path.
10. The apparatus according to claim 1, further comprising a drive structure for moving said chuckface and a workpiece held by said chuckface relative to a reference surface.
11. The apparatus according to claim 1, wherein said thinning apparatus further comprises a rotatable table for supporting a workpiece.
12. The apparatus according to claim 11, further comprising a drive to rotate said rotatable table relative to said chuckface.
13. A workpiece thinning apparatus comprising:
    a light source coupled to a communication channel;
    a vacuum source coupled to said communication channel;
    a chuckface, for holding a workpiece, coupled to said communication channel, said communication channel passing a vacuum from said vacuum source and a light beam from said light source to said chuckface.
14. The apparatus according to claim 13, wherein said light source is an optical reflectometer.
15. The apparatus according to claim 14, wherein said optical reflectometer includes a light emitting diode.
16. The apparatus according to claim 13, wherein said chuckface includes an upper cavity with vacuum communication paths to vacuum conduits on the bottom of the chuckface.
17. The apparatus according to claim 13, wherein said communication channel further includes a hollowed center.
18. A workpiece thinning apparatus comprising:
    a communication path for light and vacuum resources to reach a chuckface;
    at least one optical reflectometer connected to said communication path;
    a vacuum source connected to said communication path, and
    a chuckface, for holding a workpiece, coupled to said communications path, said communication path passing a vacuum from said vacuum source and a light beam from said optical reflectometer to said chuckface.
19. A method for measuring the thickness of a workpiece, said method comprising:
    sending an optical signal, through a stationary channel of a rotational apparatus, to an optical duct in a vacuum chuckface to reach a wafer during a thinning operation;
    measuring the time of arrival of at least one reflected optical signal from the top of said workpiece;
    measuring the time of arrival of at least one reflected optical signal from the bottom of said workpiece; and
    determining the thickness of said workpiece by calculating the difference between the time of arrival of said reflected signals.
20. The method according to claim 19, wherein the time of arrival of said reflected signals is calculated by comparing the arrival time of a reference signal to the arrival time of each reflected signal.
21. The method according to claim 19, wherein said workpiece is a semiconductor wafer.
22. The method according to claim 19, wherein said workpiece is a laser bar.
23. The method according to claim 19, wherein said workpiece is a semiconductor substrate.
24. A method for measuring the thickness of a workpiece, said method comprising:
    placing a wafer to be thinned on a table under a chuckface;
    sending an optical signal through a communication path under vacuum to said chuckface;

measuring the time of arrival of at least one reflected optical signal from the top of said workpiece;

measuring the time of arrival of at least one reflected optical signal from the bottom of said workpiece;

determining the thickness of said workpiece by calculating the difference between the time of arrival of said reflected signals; and continuing the thinning operation until the desired thickness is reached.

25. The method according to claim 24, wherein said measuring is performed while the wafer is being thinned.

26. The method according to claim 24, wherein said measuring is performed while the wafer is spinning.

27. The method according to claim 24, wherein said measuring is performed while the wafer is stationary.

28. The method according to claim 24, wherein said chuckface rotates relative to said table.

29. The method according to claim 24, wherein said table rotates relative to said chuckface.

30. The method according to claim 24, wherein said chuckface and said table rotate in opposing directions.

* * * * *